United States Patent
Jung et al.

(10) Patent No.: US 8,789,559 B2
(45) Date of Patent: Jul. 29, 2014

(54) FLOW PATH SWITCHING VALVE

(75) Inventors: Gi-Chul Jung, Changwon-si (KR); Sang-Gyu Jeon, Seoul (KR); Man-Gon Kang, Changwon-si (KR); Soon-Kwang Kwon, Changwon-si (KR); Hyeon-Cheol Choi, Chanwon-si (KR)

(73) Assignee: Hyosung Goodsprings, Inc., Seoul (KR)

( * ) Notice: Subject to any disclaimer, the term of this patent is extended or adjusted under 35 U.S.C. 154(b) by 230 days.

(21) Appl. No.: 13/280,568

(22) Filed: Oct. 25, 2011

(65) Prior Publication Data

US 2012/0103449 A1 May 3, 2012

(30) Foreign Application Priority Data

Oct. 28, 2010 (KR) .................. 10-2010-0105867
Jul. 20, 2011 (KR) .................. 10-2011-0072174

(51) Int. Cl.
*F15B 13/04* (2006.01)
*F16K 11/065* (2006.01)
*F16K 11/044* (2006.01)
*F16K 11/048* (2006.01)

(52) U.S. Cl.
USPC .............. 137/625.27; 137/625.25; 210/134

(58) Field of Classification Search
USPC ........... 137/625.25, 625.26, 625.27, 625.67, 137/625.68, 625.69, 596; 210/134, 135
See application file for complete search history.

(56) References Cited

U.S. PATENT DOCUMENTS

| 172,492 | A | * | 1/1876 | Prall ...................... 137/625.66 |
| 186,863 | A | * | 1/1877 | Meikle ................... 137/630.19 |
| 838,692 | A | * | 12/1906 | Dater ...................... 137/87.01 |
| 2,739,119 | A | * | 3/1956 | Stoner ....................... 210/134 |
| 3,682,198 | A | * | 8/1972 | Davis et al. ............. 137/625.43 |
| 3,779,280 | A | * | 12/1973 | Evans et al. ............. 137/625.5 |
| 5,306,428 | A | * | 4/1994 | Tonner ....................... 210/652 |
| 5,601,116 | A | * | 2/1997 | Sell ....................... 137/625.27 |
| 7,600,535 | B2 | * | 10/2009 | Baumgarten et al. .... 137/625.43 |

* cited by examiner

*Primary Examiner* — John Rivell
*Assistant Examiner* — Seth W MacKay-Smith
(74) *Attorney, Agent, or Firm* — Nixon Peabody LLP

(57) ABSTRACT

A flow path switching valve includes a tube body including one or more inlets opened to communicate with a fluid supplying source and supplying fluid into an inside of the tube body, outlets opened at opposite sides to the respective inlets and selectively alternately discharging fluid from the inside of the tube body, drains opened at opposite ends and discharging operating fluid introduced through the outlet, and seat units respectively protrude on an inner circumference of the tube body between the inlet(s), outlets and drains. An operating rod, coaxially mounted in the tube body, includes spaced apart projection units and is connected to an operating unit at one end so as to reciprocate axially within the tube body responsive to the operating unit. Valve bodies are movably disposed on an outer circumference of the operating rod and are arranged between the respective projection units to face respective seat units.

16 Claims, 12 Drawing Sheets

FLOW PATH SWITCHING VALVE

This application claims priority from Korean Patent Application No. 10-2011-0105867, filed on Oct. 28, 2011 and Korean Patent Application No. 10-2011-0072174, filed on Jul. 20, 2011 in the Korean Intellectual Property Office, the disclosure of each of which is hereby incorporated herein by reference in its entirety.

TECHNICAL FIELD

Apparatuses consistent with the exemplary embodiments relate to a flow path switching valve, and more particularly to a flow path switching valve in which a plurality of valve bodies are operated by one operator, i.e., one actuator to select an outlet for fluid.

BACKGROUND

In general, a flow path switching valve used in an energy recovery apparatus or the like is a means for opening and closing a flow path, to which various types of valve bodies are applied. As an example of them, there is a spool control valve of a linear spool valve device, disclosed in U.S. Pat. No. 5,797,429.

This spool control valve device is, as shown with 301 in FIG. 1, characterized in a structure that high pressure seawater or brine can be alternately supplied to high pressure vessels 305 as a spool type piston 303 plays.

Such a conventional control valve device 301 is configured to alternately discharge operating fluid in a sleeve type cylinder 307, i.e., seawater or brine to the high pressure vessel 305 by the spool type piston 303 reciprocating in the cylinder 307. Therefore, in the case where the operating fluid has low viscosity like seawater or brine, a certain gap exists between the inner circumference of the cylinder 307 and the outer circumference of the piston 303 in order to make the piston 303 smoothly slide in the cylinder 307, and thus there is a problem of unavoidable leakage of the operating fluid.

To solve this problem, there has been proposed a 3-directional poppet valve disclosed in U.S. Pat. No. 7,540,550, in which a poppet-shaped control valve is used to minimize the leakage between the cylinder and the piston, thereby having little leakage and improving energy efficiency. However, a plurality of actuators are needed corresponding to a plurality of poppet valves, and each actuator has to be separately controlled, thereby causing problems that the whole structure or control becomes complicated and the costs of equipment, maintenance, etc. increase.

As another example, there has been proposed not the foregoing reciprocation type control valve but a rotation type control valve disclosed in U.S. Pat. No. 7,600,535, in which an inner rotor is rotated by external power to open and close a flow path of a casing and the rotor, thereby acquiring a desired system response. However, the rotation type control valve must leave a certain gap between the rotor and the casing, and thus the leakage in the gap is inevitable. Accordingly, there is a problem that system efficiency is lowered due to the leakage.

SUMMARY

Accordingly, one or more exemplary embodiments are conceived to solve the foregoing problems of the conventional flow path switching valve, and an aspect thereof is to provide a flow path switching valve, in which a valve body for switching a flow path can smoothly move in a valve tube body with little leakage through the valve body when the valve is opened and closed using seawater, brine or the like water as operating fluid, thereby improving a flow path switching characteristic of a valve and enhancing energy efficiency of a system to which the valve is applied.

Another exemplary embodiment is to provide a flow path switching valve, in which opening and closing operations of a valve body is achieved by a single operating unit, so that the whole system to which the valve is applied can have a significantly simple structure and thus costs of equipment or maintenance can be largely reduced.

Still another exemplary embodiment is to provide a flow path switching valve, in which not only a valve body but also an operating rod to which the valve body is mounted is improved in assembling efficiency to thereby decrease work or costs needed for repair, replacement or the like maintenance of the valve body or operating rod, and the valve body's own durability is enhanced to thereby increase the working life of the whole valve.

The foregoing and/or other aspects may be achieved by providing a flow path switching valve including: a tube body which includes one or more inlets opened to communicate with a fluid supplying source and supplying fluid into an inside, two or more outlets opened at opposite sides to the respective inlets and selectively alternately discharging the fluid from the inside, drains opened at opposite ends and discharging operating fluid introduced through the outlet, and seat units respectively protrudes on an inner circumference between the inlets, the outlets and the drains; an operating rod which is coaxially mounted in the tube body, includes a plurality of projection units protruding as being spaced apart from each other on an outer circumference thereof, is connected to an operating unit at one end thereof hermetically exposed to an outside, and reciprocates forward and backward in an axial direction within the tube body by the operating unit; and a plurality of valve bodies which are movably mounted onto the outer circumference of the operating rod and arranged between the respective projection units to face and one-to-one correspond to the respective seat units.

When the valve body pressed by one projection unit of the projection units disposed on both sides of the inlet is seated on one sucking seat unit of the sucking seat units disposed on both sides of the inlet, the other projection unit may be formed at a location where the valve body can be separated from the other sucking seat unit by pressure of fluid introduced via the inlet, the one end projection unit may be formed at a location where the valve body can be separated from the one end drain seat unit disposed between the one end outlet and the one drain, and the other end projection unit may be formed at a location where the valve body can be seated on the other end drain seat unit disposed between the other end outlet and the other drain.

When the valve body pressed by the other projection unit of the projection units disposed on both sides of the inlet is seated on the other sucking seat unit of the sucking seat units disposed on both sides of the inlet, the one projection unit may be formed at a location where the valve body can be separated from the one sucking seat unit by pressure of fluid introduced via the inlet, the one end projection unit may be formed at a location where the valve body can be seated on the one end drain seat unit disposed between the one end outlet and the one drain, and the other end projection unit may be formed at a location where the valve body can be separated from the other end drain seat unit disposed between the other end outlet and the other drain.

The operating rod may include a main bar arranged in a section between the sucking seat units and processed to have bolts at opposite ends thereof, an end bar arranged in an outer section of the drain seat unit and processed to have a bolt hole at an inner side facing the main bar; and a connection bar arranged between the main bar and the respective end bars, and processed to have a bolt hole at an inner side facing the main bar and a bolt at on outer side facing the end bar.

The valve body may be provided in the form of a poppet, a disk or a hemisphere, and the seat unit may have an inclined or flat surface to closely contact an inclined surface of the poppet, a flat surface of the disc and a spherical surface of the hemisphere, respectively.

The flow path switching valve may further include a sealing ring interposed between the valve body and the seat unit and coupled to either of the valve body or the seat unit.

The sucking valve body may include a poppet unit coaxially coupled to the operating rod and having an outer diameter larger than an inner diameter of the sucking seat unit; a spool unit protruding from the poppet unit toward the sucking seat unit and securing a length enough to closely contact the sucking seat unit before the drain projection unit separates the drain valve body from the drain seat unit; and a guide unit radially protruding from the spool unit toward the sucking seat unit while leaving a predetermined distance from each other, and keeping inserted in the sucking seat unit even at a maximum opening position, and the other one drain projection unit may be formed at a location where the other one drain valve body can closely contact the other one corresponding drain seat unit before the other one sucking valve body is separated from the other one corresponding sucking seat unit.

The one drain projection unit may be formed at a location where the one sucking projection unit makes the one corresponding sucking valve body closely contact the one sucking seat unit and then the one drain valve body be separated from the one corresponding drain seat unit, and the one sucking valve body may be configured to closely contact the one sucking seat unit before the one drain projection unit makes the one drain valve body be separated from the one drain seat unit, and continuously block up flow from the inlet to the one drain while the one drain valve body is separated from the one drain seat unit.

The flow path switching valve may further include a balancing projection unit formed on the operating rod between the opposite ends of the tube body and the opposite drains; a balancing valve body mounted to the operating rod between the opposite ends of the tube body and the balancing projection unit and slidably contacting the inner circumference of the tube body to form a balancing chamber together with the opposite ends of the tube body; and at least one pair of bypassing tubes for connecting the respective balancing chamber with an inner space of the tube body of which the outlet relatively far away from the balancing chamber of the at least one pair of outlets is opened.

The sucking valve bodies may be respectively fixed on surfaces of the corresponding sucking projection units facing the inlet.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION

Below, a flow path switching valve according to exemplary embodiments will be described with reference to accompanying drawings.

Figure 1:
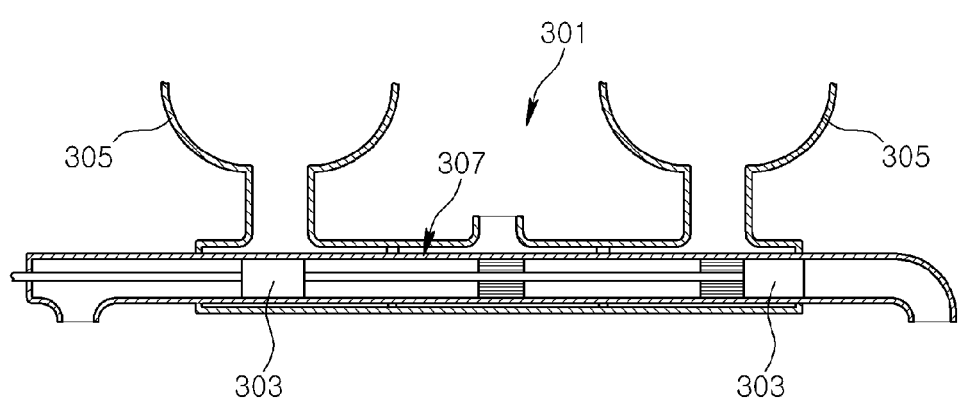
FIG. 1 is a longitudinal section view of a conventional flow path switching valve.
Figure 2:
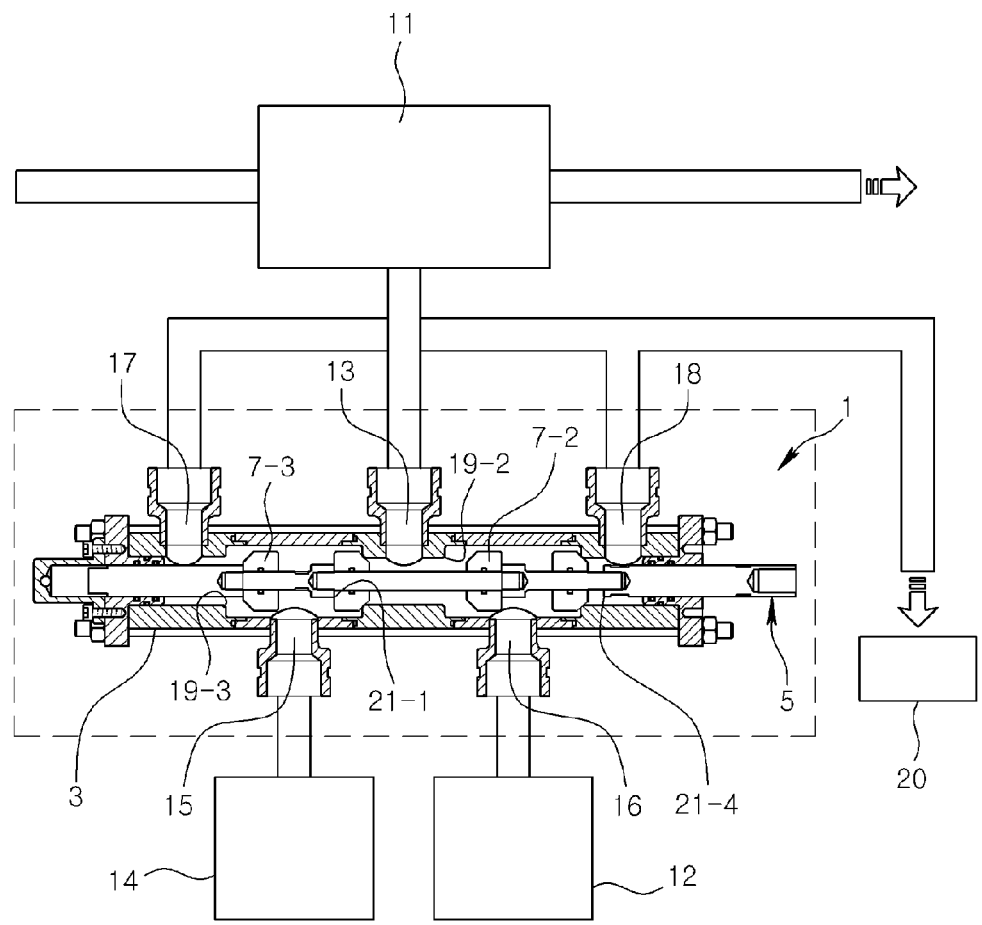
FIG. 2 is a longitudinal section view of partially illustrating a fluid system to which a flow path switching valve is applied according to an exemplary embodiment.
Figure 3:
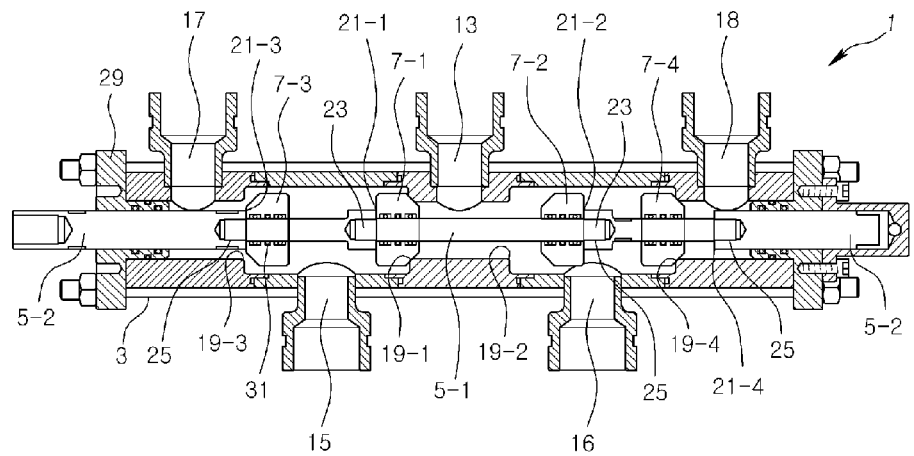
FIG. 3 is a longitudinal section view of illustrating that an operating rod of the flow path switching valve of FIG. 2 is located at a right side.

As shown in FIGS. 2 and 3, the flow path switching valve in this exemplary embodiment includes a tube body 3, an operating rod 5, and valve bodies 7-1, 7-2, 7-3 and 7-4, which is configured to selectively alternately discharge operating fluid, introduced from a fluid supplying source through one or more inlets 13, through two or more outlets 15 and 16.

Here, the tube body 3 forms a body of the flow path switching valve, and is shaped like a long pipe, in which one or more inlets 13 provided in the middle, two or more outlets 15 and 16 respectively provided at opposite sides of each inlet 13, and drains 17 and 18 provided at opposite ends are opened.

The inlet 13 is, as shown in FIG. 2, connected to the fluid supplying source 11 and supplies fluid to the inside of the tube body 3. As necessary, one or more inlets may be provided. At this time, the fluid supplied at the fluid supplying source 11, i.e., the fluid controlled by the flow path switching valve 1 includes fluid having little viscosity like water such as seawater or brine. Also, two or more outlets 15 and 16 are opened at opposite sides to the inlet 13 of the tube body 3 and configured to selectively alternately discharge the fluid in the tube body 3 in accordance with operations of the valve bodes 7-1, 7-2, 7-3 and 7-4. Also, the drains 17 and 18 are opened at opposite ends of the tube body 3 and configured to drain the fluid, introduced from external tanks 12 and 14 via the outlets 15 and 16 when connecting with the outlets 15 and 16, to the drainage tank 20 through the drains 17 and 18.

Meanwhile, the tube body 3 includes seat units 19-1, 19-2, 19-3 and 19-4 respectively protruding from the inner circumference thereof between the inlet 13, outlet 15, 16 and drain 17, 18 and another adjacent inlet 13, outlet 15, 16 and drain 17, 18. The inner circumference between the seat units 19-1 and 19-2 and the inner circumference from the seat units 19-3 and 19-4 to the end of the tube body 3 are formed to have a reduced diameter as shown therein. Relatively, the other inner circumference forms a large diameter through which the valve bodies 7-1, 7-2, 7-3 and 7-4 can move.

The operating rod 5 is connected to an external operating unit and moves the valve bodies 7-1, 7-2, 7-3 and 7-4 within the tube body 3 to control the flow path of the flow path switching valve 1. The operating rod 5 is coaxially arranged in the tube body 3 and has one end exposed to the outside of the tube body 3 and connected to the operating unit in the state that the fluid is sealed up. Thus, the operating rod 5 is configured to reciprocate forward and backward in an axial direction within the tube body 3. To this end, the cooperating rod 5 is supported to slide as it is hermetically kept by sealing caps 29 coupled to opposite ends of the tube body 3.

Also, the operating rod 5 is formed with a plurality of projection units 21-1, 21-2, 21-3 and 21-4 protruding on the outer circumference thereof as they are spaced from each other, thereby pressing and moving the plurality of valve bodies 7-1, 7-2, 7-3 and 7-4 fitted on the outer circumference. As shown in FIG. 3, when the left projection 21-1 of sucking projection units 21-1 and 21-2 disposed on both sides of the inlet 13 of the tube body 3 presses and seats the sucking valve body 7-1 located just on the left of the inlet 13 to the left seat unit 19-1 of the sucking seat units 19-1 and 19-2 disposed on both sides of the inlet 13, the right projection unit 21-2 of the sucking projection units 21-1 and 21-2 disposed on both sides of the inlet 13 is formed at a location where there is no interference so that the pressure of the fluid introduced through the inlet 13 can cause the sucking valve body 7-2 located just on the right of the inlet 13 to separate from the right sucking seat unit 19-2. At the same time, the drain projection unit 21-3 located at a left end of the tube body 3 is formed at a location where the left drain valve body 7-3 can be pressed to separate from the left drain seat unit 19-3 located between the left outlet 15 and the left drain 17, and the right drain projection unit 21-4 of the tube body 3 is formed at a location where there is no interference so that the right drain valve body 7-4 can be seated on the right drain seat unit 19-4 located between the right outlet 16 and the right drain 18.

Figure 4:
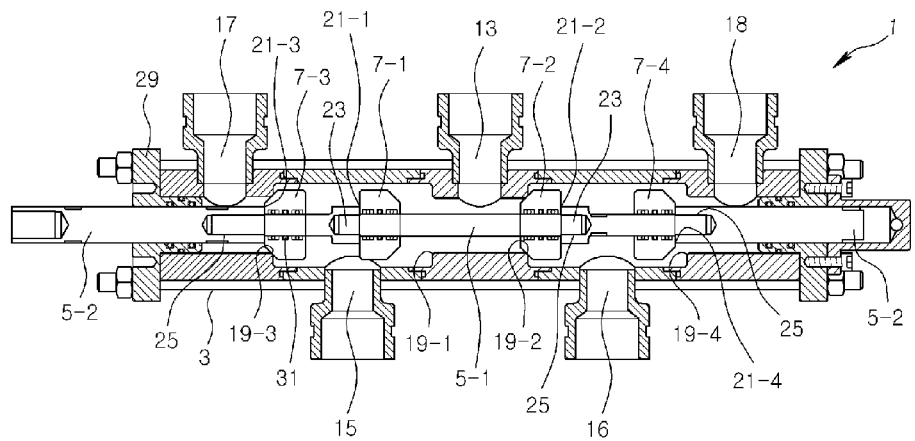
FIG. 4 is a longitudinal section view of illustrating that the operating rod of the flow path switching valve of FIG. 2 is located at a left side.

Likewise, in the operating rod 5 as shown in FIG. 4, when the right projection unit 21-2 of the sucking projection units 21-1 and 21-2 disposed on both sides of the inlet 13 of the tube body 3 presses and seats the sucking valve body 7-2 located just on the right of the inlet 13 to the right seat unit 19-2 of the sucking seat units 19-1 and 19-2 disposed on both sides of the inlet 13, the left projection unit 21-1 of the sucking projection units 21-1 and 21-2 disposed on both sides of the inlet 13 is formed at a location where there is no interference so that the pressure of the fluid introduced through the inlet 13 can cause the sucking valve body 7-1 located just on the left of the inlet 13 to separate from the left sucking seat unit 19-1. At the same time, the drain projection unit 21-4 located at a right end of the tube body 3 is formed at a location where the right drain valve body 7-4 can be pressed to separate in the right drain seat unit 19-4 located between the right outlet 16 and the right drain 18, and the left drain projection unit 21-3 of the tube body 3 is formed at a location where there is no interference so that the left drain valve body 7-3 can be seated on the left drain seat unit 19-3 located between the left outlet 15 and the right drain 17.

To this end, the operating rod 5 may include the plurality of projection units 121-1, 121-2, 121-3 and 121-4 mounted on the outer circumference of a cylindrical bar lengthwise extended in an axial direction as shown in FIGS. 11 to 17 like a operating rod 105 of a flow path switching valve 101 according to a second exemplary embodiment, and be configured to press and move the plurality of valve bodies 7-1, 7-2, 7-3 and 7-4 by the projection units 121-1, 121-2, 121-3 and 121-4. Alternatively, a plurality of short bars may be assembled into the operating rod 5. In this case, the short bars may be assembled in various forms. For example, as shown in FIGS. 3 and 4, the short bars may be assembled by a coupling method based on a bolt and a bolt hole, in which the operating rod 5 includes a main bar 501, end bars 5-2, and connection bars 5-3.

Here, the main bar 5-1 is arranged between the sucking seat units 19-1 and 19-2 disposed on both sides of the inlet 13, i.e., arranged in the middle of the operating rod 5 and processed to have bolts 23 at opposite ends thereof. Also, the end bars 5-2 are coupled to the opposite ends of the operating rod 5. The end bars 5-2 are arranged in outer sections of the drain seat units 19-3 and 19-4 of the tube body 3, and respectively processed to have bolt holes 25 at inner ends facing the main bar 5-1 so as to be coupled with the bolts 23 of the connection bar 5-3. Last, the connection bar 5-3 may include two or more bars between the main bar 5-1 and each end bar 5-2 as a bar for connecting the main bar 5-1 and the end bar 5-2. The connection bar 5-3 includes an inner end facing the main bar 5-1 and processed to have the bolt hole 25, and an inner end facing the end bar 5-2 and processed to have the bolt 23, thereby achieving serial connection from the main bar 5-1 to the end bar 5-2.

The plurality of valve bodies 7-1, 7-2, 7-3 and 7-4 are movably mounted onto the outer circumference of the operating rod 5 and allow the flow paths to the outlets 15 and 16 and the drains 17 and 18 to be selectively alternately opened and closed by the operating rod 5. Further, the plurality of valve bodies 7-1, 7-2, 7-3 and 7-4 are respectively arranged between the projection units 21-1, 21-2, 21-3 and 21-4 so as to face and one-to-one correspond to the seat units 19-1, 19-2, 19-3 and 19-4.

Figure 5:
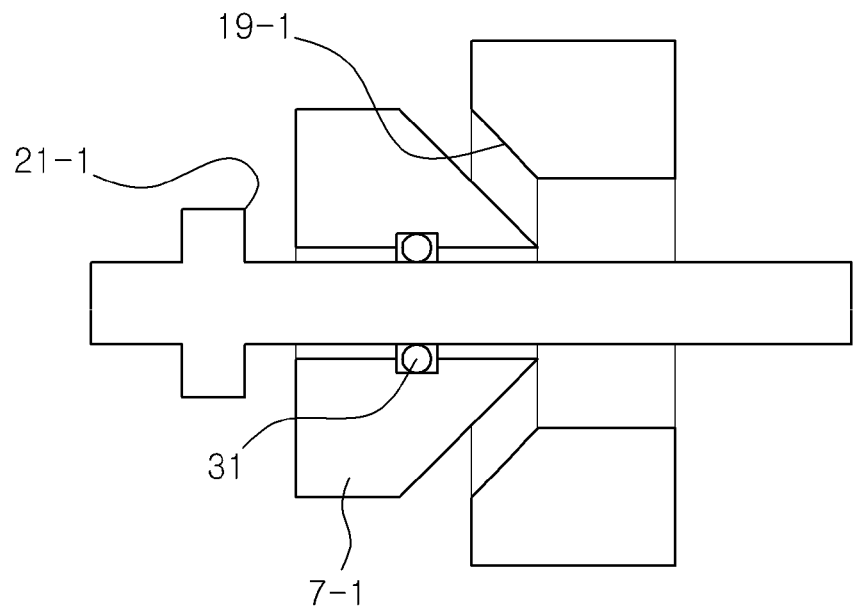
FIG. 5 is a longitudinal section view of partially illustrating a poppet type valve body of the flow path switching valve of FIG. 2.

Also, each of the valve bodies 7-1, 7-2, 7-3 and 7-4 is provided in the form of a poppet type as shown in FIGS. 3 to 5 in order to hermetically seal up the operating fluid such as water having little viscosity. In addition, a sealing ring 31 is provided between each of the poppet type valve bodies 7-1, 7-2, 7-3 and 7-4 and the operating rod 5, thereby hermetically sealing up a gap between each of the valve bodies 7-1, 7-2, 7-3 and 7-4 moving on the operating rod 5 and the operation rod 5. At this time, each of the seat units 19-1, 19-2, 19-3 and 19-4 of the tube body 3 are formed to have an inclined surface corresponding to and closely contacting an inclined surface of the poppet.

Figure 6:
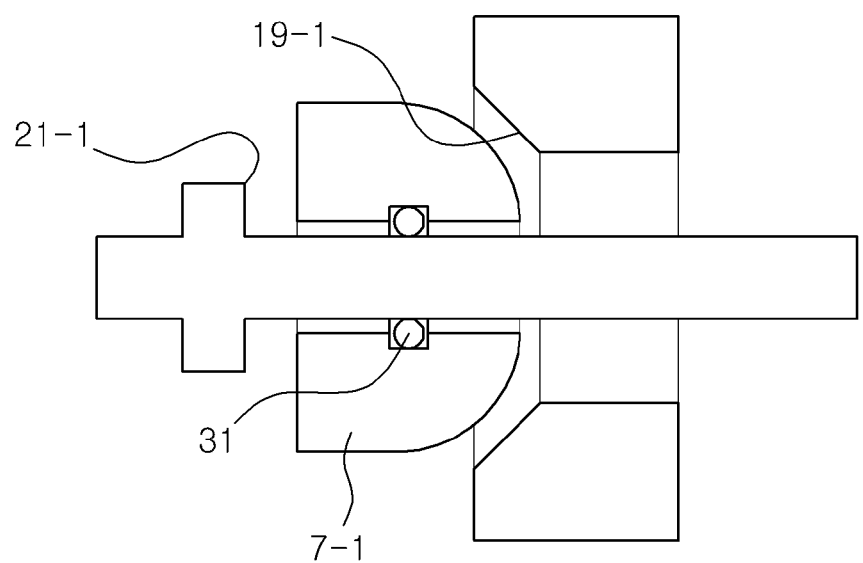
FIG. 6 is a longitudinal section view of illustrating a spherical valve body of the flow path switching valve of FIG. 2.
Figure 7:
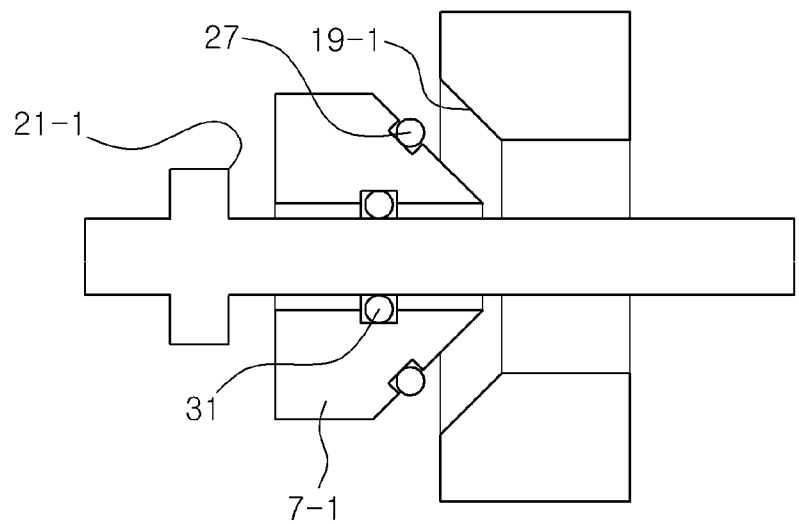
FIG. 7 is a view showing that a sealing ring is mounted to the poppet type valve body of FIG. 5.
Figure 8:
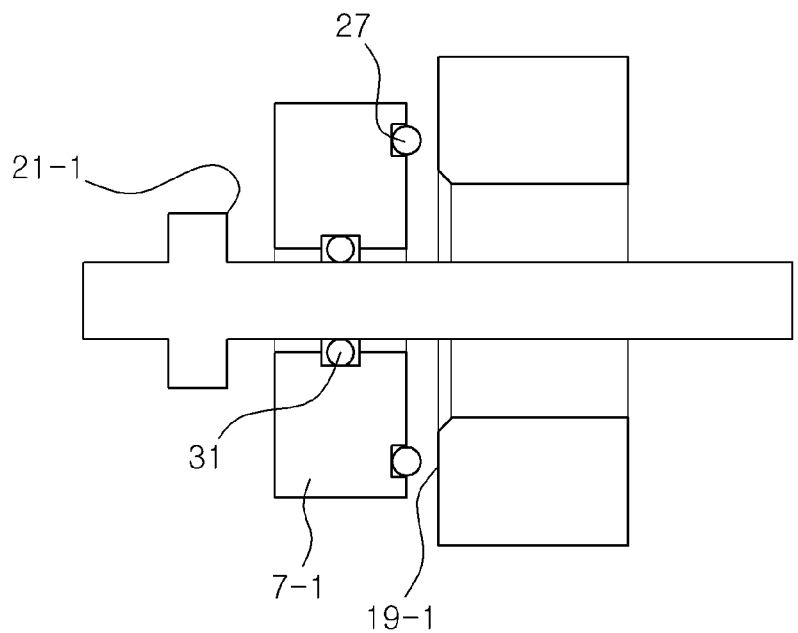
FIG. 8 is a longitudinal section view of partially illustrating a disc type valve body of the flow path switching valve of FIG. 2, in which the sealing ring is mounted to a disc.
Figure 9:
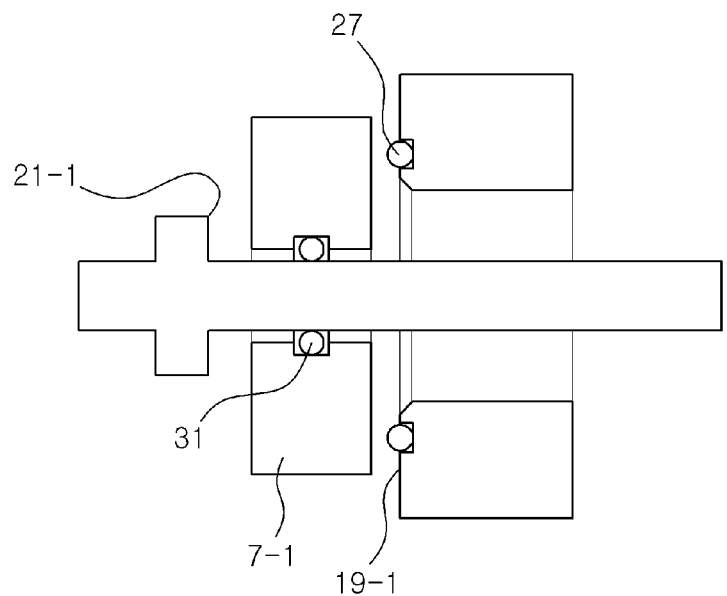
FIG. 9 is a view showing that the sealing ring is mounted to a seat unit of a tube body in FIG. 8.

Also, each inclined surface of the valve bodies 7-1, 7-2, 7-3 and 7-4 may be rounded as shown in FIG. 6. Further, a sealing ring 27 may be added on the inclined surface as shown in FIG. 7, Further, each of the valve bodies 7-1, 7-2, 7-3 and 7-4 may be provided in the form of a disc as shown in FIGS. 8 and 9. At this time, the seat unit 19-1 may be flat or recessed corresponding to a disc surface of the disc type valve body 7-1, or a sealing ring 27 may be provided in either of the valve body 7-1 or the seat unit 19-1 and thus interposed between the valve body 7-1 and the seat unit 19-1.

Meanwhile, a flow path switching valve according to another exemplary embodiment is shown with a reference numeral of 101 in FIGS. 11 to 18.

The flow path switching valve 101 in this exemplary embodiment includes a tube body 103, an operating rod 105 and a plurality of valve bodies 107-1, 107-2, 107-3 and 107-4 like that of the first exemplary embodiment, in which the tube body 103 and the operating rod 105 are equal or similar to the tube body 3 and the operating rod 5 of the first exemplary embodiment, and thus repetitive descriptions thereof will be avoided.

Figure 11:
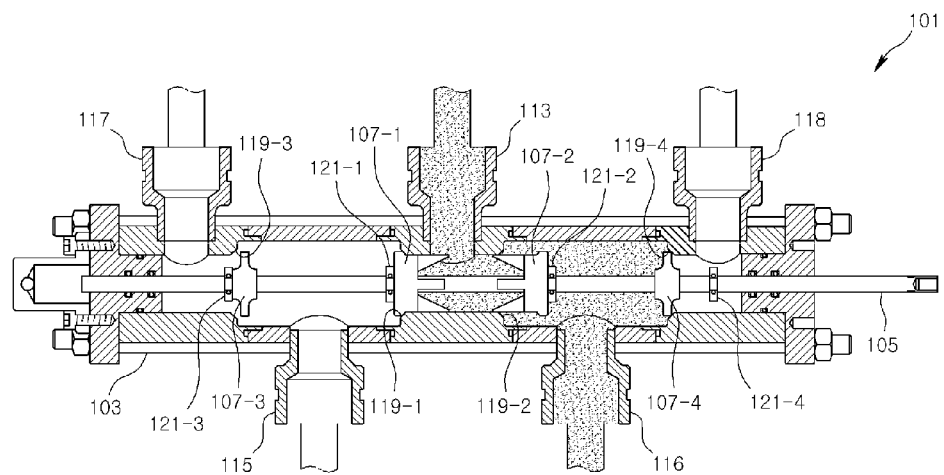
FIG. 11 is a longitudinal section view of illustrating that the operating rod of the flow path switching valve is located at a right dead point according to another exemplary embodiment.

However, as shown in FIGS. 11 to 17, the operating rod 105 is an operating member shaped like a bar lengthwise extended in an axial direction, in which a plurality of projection units 121-1, 121-2, 121-3 and 121-4 are protruded like a stopper on the outer circumference of the operating rod 105 as being spaced apart from each other so as to press and move the plurality of valve bodies 107-1, 107-2, 107-3 and 107-4 fitted on the outer circumference. As shown in FIG. 11, when the left sucking projection unit 121-1 of the sucking projection units 121-1 and 121-2 disposed on both sides of the inlet 113 of the tube body 103 presses and seats the corresponding sucking valve body 107-1 located on the left of the inlet 113 to the left corresponding seat unit 119-1 of the sucking seat units 119-1 and 119-2 disposed on both sides of the inlet 113, the right sucking projection unit 121-2 of the sucking projection units 121-1 and 121-2 is formed at a location where there is no interference so that the pressure of the operating fluid introduced through the inlet 113 can cause the right sucking valve body 107-2 located on the right of the inlet 113 to be spaced apart from the corresponding right sucking seat unit 119-2. At the same time, the drain projection unit 121-3 of the drain projection units 121-3 and 121-4 located at a left end of the tube body 103 between the outlet 115, 116 and the drain 117, 118 is formed at a location where the left drain valve body 107-3 can be pressed to be spaced apart from the left drain seat unit 119-3 located between the left outlet 115 and the left drain 117, and the right drain valve body 107-4 corresponding to the right drain projection unit 121-4 of the tube body 103 is formed at a location where there is no interference so that the corresponding right drain valve body 107-4 can be seated on the corresponding right drain seat unit 119-4 located between the right outlet 116 and the right drain 118.

Figure 12:
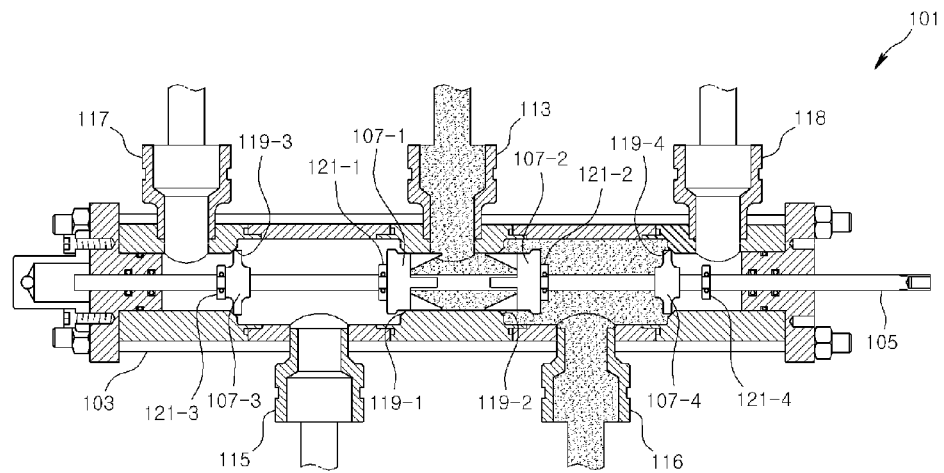
FIG. 12 is a view showing a state that a left drainage valve body of the flow path switching valve of FIG. 11 begins to closely contact a left drainage seat unit.
Figure 13:
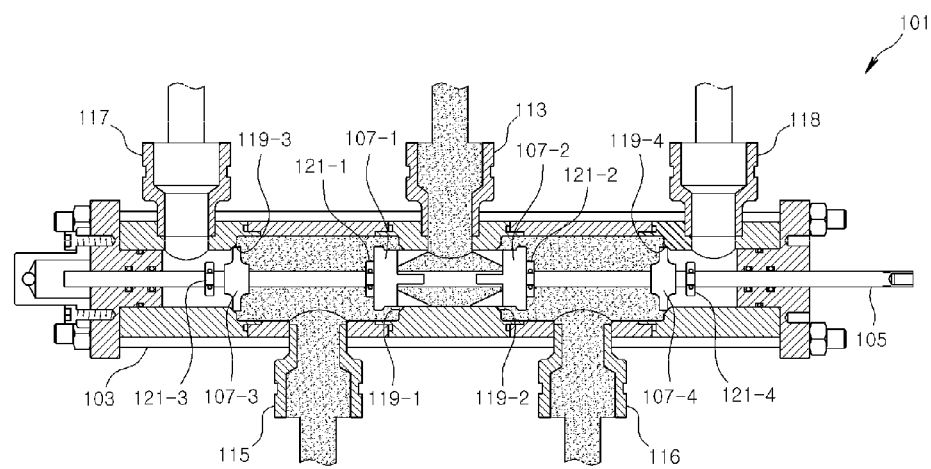
FIG. 13 is a view showing a neutral state where the operating rod of the flow path switching valve of FIG. 11 is located in the middle within the valve tube body.

At this time, particularly as shown in FIG. 12, the left drain projection unit 121-3 is formed at a location where the left drain valve body 107-3 is sealed up in the corresponding left drain seat unit 119-3 before the left sucking valve 107-1 is spaced apart from the corresponding left sucking seat unit 119-1, so that the left drain valve body 107-3 can first become in close-contact with the left drain seat unit 119-3 before fluid communication between the inlet 113 and the left outlet 115 as shown in FIG. 13.

Figure 14:
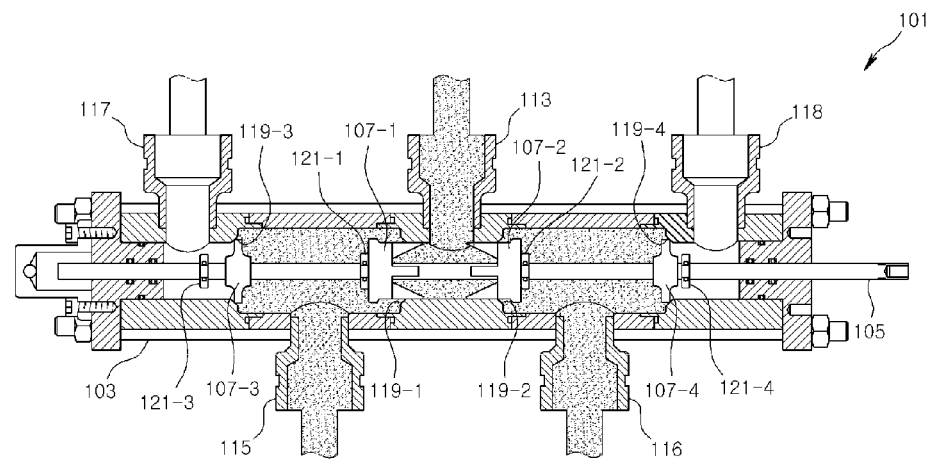
FIG. 14 is a view showing a state that a right sucking valve body of the flow path switching valve of FIG. 11 begins to seal up a right sucking seat unit.

Also, as shown in FIG. 14, the right drain projection unit 121-4 is formed at a location where the corresponding right drain valve body 107-4 is separated from the corresponding right drain seat unit 119-4 after the right sucking projection unit 121-2 makes the corresponding right sucking valve body 107-2 be in close-contact with the corresponding right sucking seat unit 119-2.

To this end, the right sucking valve body 121-2 becomes in close contact with the right sucking seat unit 119-2 before the right drain projection unit 121-4 separates the right drain valve body 107-4 from the right drain seat unit 119-4, and maintains the close contact with the right sucking seat unit 119-2 until after the right drain projection unit 121-4 separates the right drain valve body 107-4 from the right drain seat unit 119-4. Thus, flow from the inlet 113 to the right drain 118 is continuously obstructed while the right drain valve body 107-4 is separated from the right drain seat unit 119-4.

Figure 15:
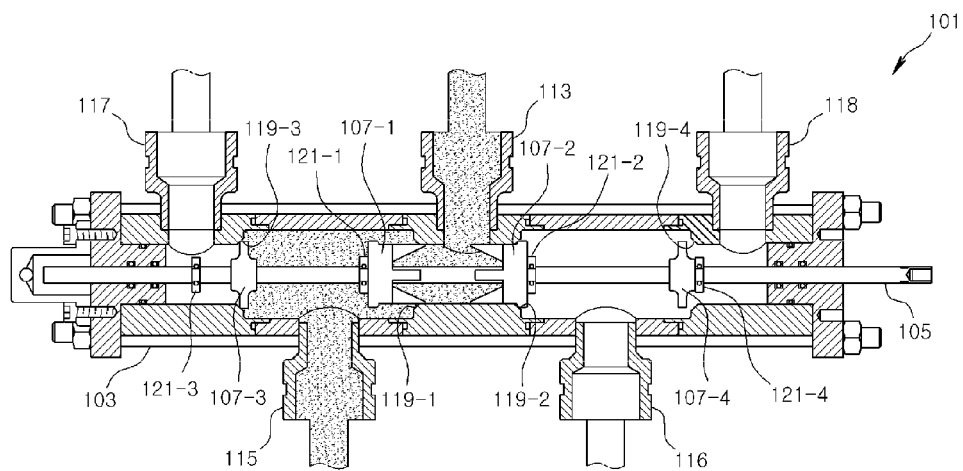
FIG. 15 is a longitudinal section view of illustrating that the operating rod of the flow path switching valve of FIG. 11 is located in a left dead point.

Likewise, in the operating rod 105 as shown in FIG. 15, when the right sucking projection unit 121-2 of the sucking projection units 121-1 and 121-2 disposed on both sides of the inlet 113 of the tube body 103 presses and seats the sucking valve body 107-2 located on the right of the inlet 113 to the corresponding right sucking seat unit 119-2 of the sucking seat units 119-1 and 119-2 disposed on both sides of the inlet 113, the left sucking projection unit 121-1 of the sucking projection units 121-1 and 121-2 is formed at a location where there is no interference so that the pressure of the operating fluid introduced through the inlet 113 can cause the corresponding left sucking valve body 107-1 located on the left of the inlet 113 to be separated from the left corresponding sucking seat unit 119-1. At the same time, the drain projection unit 121-4 located at a right end of the tube body 103 between the drain projection units 121-3 and 121-4 between the outlet 115, 116 and the drains 117, 118 is formed at a location where the corresponding right drain valve body 107-4 can be pressed to be separated in the corresponding right drain seat unit 119-4 located between the right outlet 116 and the right drain 118, and the left drain projection unit 121-3 of the tube body 103 is formed at a location where there is no interference so that the left drain valve body 107-3 can be seated on the left drain seat unit 119-3 located between the left outlet 115 and the right drain 117.

Figure 16:
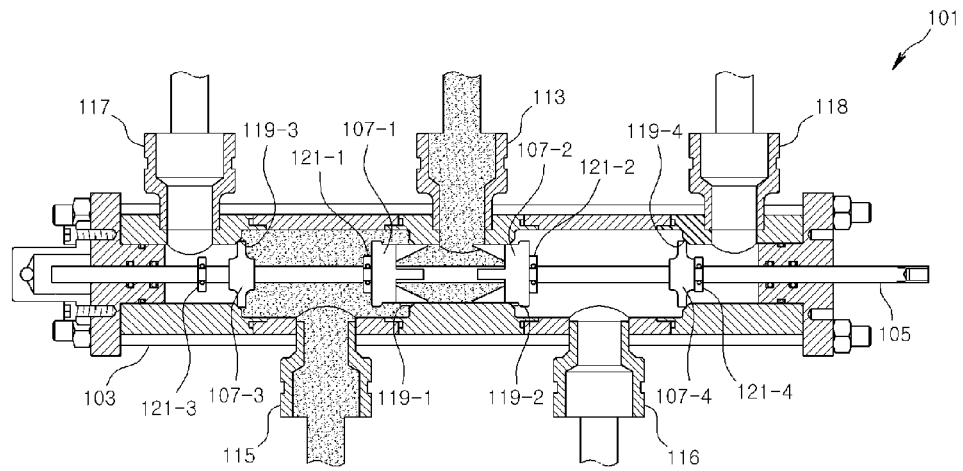
FIG. 16 is a view showing a state that a right drainage valve body of the flow path switching valve of FIG. 11 begins to closely contact a right drainage seat unit.

At this time, as shown in FIG. 16, the right drain projection unit 121-4 is formed at a location where the right drain valve body 107-4 is sealed up in the corresponding right drain seat unit 119-4 before the right sucking valve body 107-2 is spaced apart from the corresponding right sucking seat unit 119-2, so that the right drain valve body 107-4 can first become in close-contact with the right drain seat unit 119-4 before fluid communication between the inlet 113 and the right outlet 115 as shown in FIG. 13.

Figure 17:
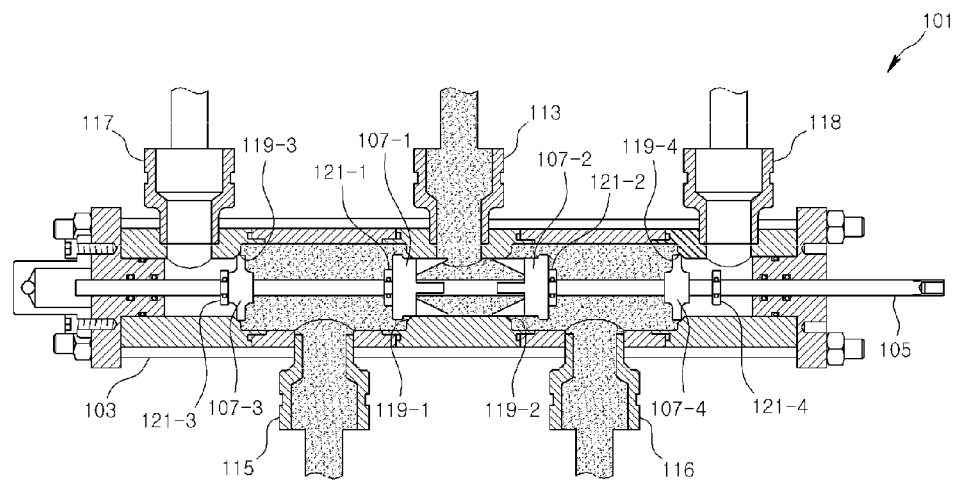
FIG. 17 is a view showing a state that a left sucking valve body of the flow path switching valve of FIG. 11 begins to seal up a left sucking seat unit.

Also, as shown in FIG. 17, the left drain projection unit 121-3 is formed at a location where the corresponding left drain valve body 107-3 is separated from the corresponding left drain seat unit 119-3 after the left sucking projection unit 121-1 makes the corresponding left sucking valve body 107-1 be in close-contact with the corresponding left sucking seat unit 119-1.

To this end, the left sucking valve body 107-1 becomes in close contact with the left sucking seat unit 119-1 before the left drain projection unit 121-3 separates the left drain valve body 107-3 from the left drain seat unit 119-3, and maintains the close contact with the left sucking seat unit 119-1 until after the left drain projection unit 121-3 separates the left drain valve body 107-3 from the left drain seat unit 119-3. Thus, flow from the inlet 113 to the left drain 117 is continuously obstructed while the left drain valve body 107-3 is separated from the left drain seat unit 119-3.

The plurality of valve bodies 107-1, 107-2, 107-3 and 107-4 are movably mounted on the outer circumference of the operating rod 105 and allow the operating rod 105 to selectively alternately open and close the flow path to the outlets 115 and 116 and the drains 117 and 118. Further, the plurality of valve bodies 107-1, 107-2, 107-3 and 107-4 are arranged between the respective projection units 121-1, 121-2, 121-3 and 121-4 so as to face and one-to-one correspond to the respective seat units 119-1, 119-2, 119-3 and 119-4.

Figure 18:
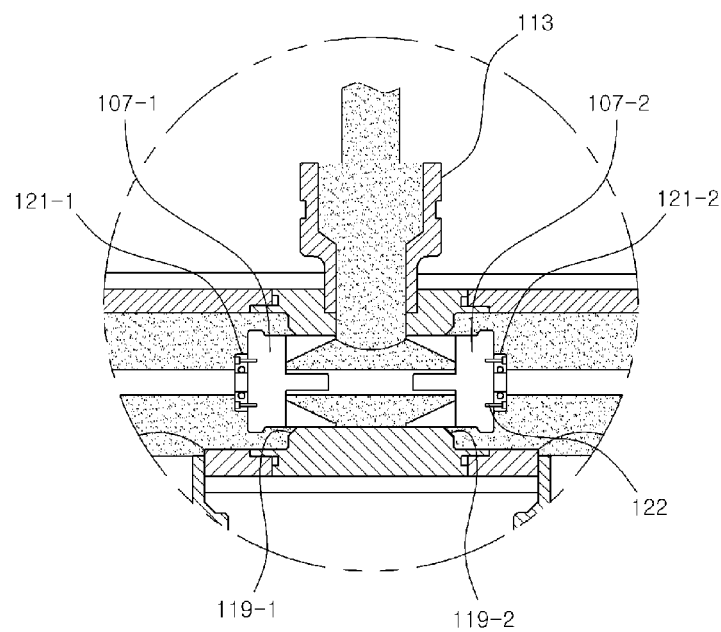
FIG. 18 is an enlarged section view showing that the sucking projection units and the sucking valve bodies of FIGS. 11 to 17 are fastened by a bolt.

At this time, as shown in FIGS. 11 to 17, the sucking valve bodies 107-1 and 107-2 located between the inlet 113 and the outlets 115 and 116 among the valve bodies 107-1, 107-2, 107-3 and 107-4 may be movably fitted between the inlet 113 and the corresponding sucking projections 121-1 and 121-2 on the operating rod 105 and be operated by the operating fluid introduced from the inlet 113 as being in close contact with the respectively corresponding sucking projection units 121-1 and 121-2. However, as shown in FIG. 18, the sucking valve bodies 107-1 and 107-2 may be reciprocated along with the operating rod 105 as being fastened to the surfaces of the respectively corresponding sucking projection units 121-1 and 121-2 facing the inlet 113 by a bolt 122 or the like fastening unit.

Figure 19:
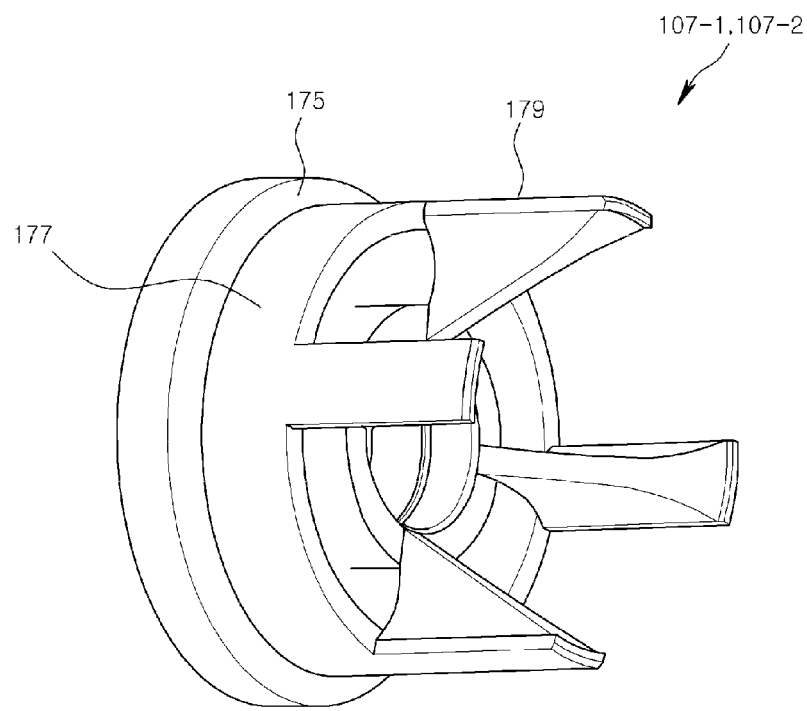
FIG. 19 is a perspective view of the valve body of FIGS. 11 to 18.

Also, as shown in FIG. 19, the sucking valve bodies 107-1 and 107-2 include a poppet unit 175, a spool unit 177 and a guide unit 179. The poppet unit 175 is a cylindrical body coaxially coupled to the operating rod 105, which as shown in FIG. 19 has an outer diameter larger than each inner diameter of the left and right sucking seat units 119-1 and 119-2 and has inclined end surfaces facing the left and right sucking seat units 119-1 and 119-2 and thus closely contacting inclined surfaces formed at end surface edges of the left and right sucking seat units 119-1 and 119-2, thereby hermetically sealing up and blocking up the flow path formed through the left and right sucking seat units 119-1 and 119-2.

The spool unit 177 is a part for keeping a close-contact section, i.e., a close-contact time long between the sucking valve bodies 107-1 and 107-2 and the left and right sucking seat units 119-1 and 119-2, and as shown in FIG. 19 coaxially protrudes from the poppet unit 175 toward each of the left and right sucking seat units 119-1 and 119-2, so that length enough to be in close contact with the left and right sucking seat units 119-1 and 119-2 can be secured before the left and right drain projection units 121-3 and 121-4 respectively separate the left and right drain valve bodies 107-3 and 107-4 from the left and right drain seat units 119 and 119-4 as shown in FIGS. 14 and 17.

The guide unit 179 is a part for allowing the sucking valve bodies 107-1 and 107-2 to keep inserted in the left and right sucking seat units 119-1 and 119-2 even at the maximum opening position, and is as shown in FIG. 19 coaxially extended from the end surface of the spool unit 177 toward the left and right sucking seat units 119-1 and 119-2, respectively. As shown therein, the guide units 179 radially protrude leaving a predetermined distance from one another, and allow the operating fluid to flow through the sucking valve bodies 107-1 and 107-2 at a predetermined level or higher while keeping inserted in the sucking seat units 119-1 and 119-2.

Meanwhile, a flow path switching valve 101 according to another exemplary embodiment further includes balancing projection units 121-5 and 121-6, balancing valve bodies 10-7-5 and 107-6, and a pair of bypassing tubes 135 and 136.

The balancing projection units 121-5 and 121-6 are fixed on the operating rod 105 between the left and right opposite sides of the tube body 103 and the left and right drains 117 and 118, respectively, and are configured to move along with the operating rod 105 so as to press the balancing valve bodies 107-5 and 107-6 or on the contrary be pressed by the balancing valve bodies 107-5 and 107-6 so as to move the operating rod 105.

Also, the balancing valve bodies 107-5 and 107-6 are slidably mounted onto the outer circumference of the operating rod 105 or fastened to the balancing projection units 121-5 and 121-6 by a bolt or the like between the opposite sides of the tube body 103 and the balancing projection unit 121-5 and 121-6, so that the balancing valve bodies 107-5 and 107-6 can be in sliding contact with the inner circumference of the tube body 103, thereby forming balancing chambers 133-1 and 133-2 together with the opposite sides of the tube body 103.

Figure 20:
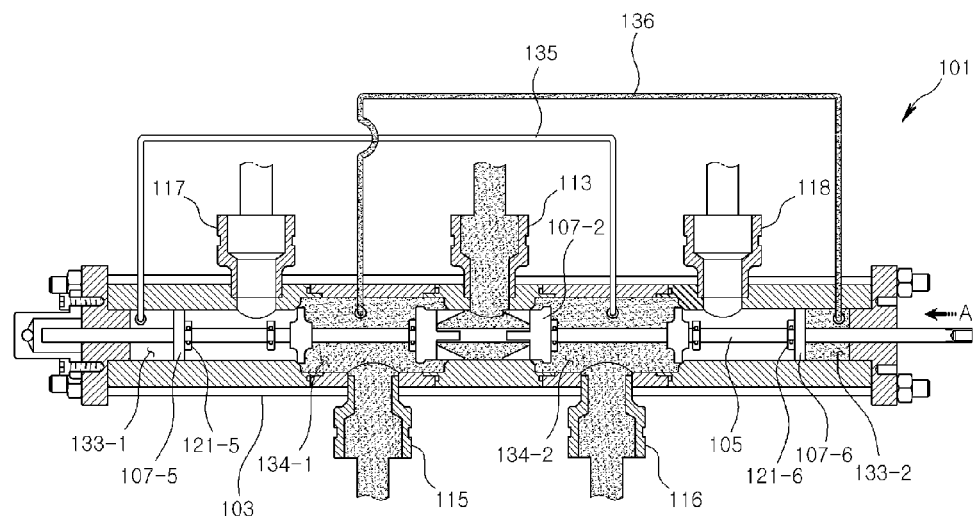
FIG. 20 is a view showing a flow path switching valve according to another exemplary embodiment.

The pair of bypassing tubes 135 and 136, as shown in FIG. 20, are used to communicate the balancing chambers 133-1 and 133-2 with inner spaces 134-2 and 134-1 of the tube body 103 of which the outlets 115 and 115 respectively far away from the balancing chambers 133-1 and 133-2 are opened. When the operating rod 105 is moved toward the high pressure for example, in a direction of (A) in FIG. 20, the high pressure, i.e., pressure in the inner space 134-1 of the tube body 103 of which the outlet 115 located relatively far away from the corresponding balancing chamber 133-1 or 133-2 is opened between two outlets 115 and 116 is used to decrease a force for operating the operating rod 105.

With the above configurations, the operations of the flow path switching valve 1 according to an exemplary embodiment will be described as follows.

Figure 10:
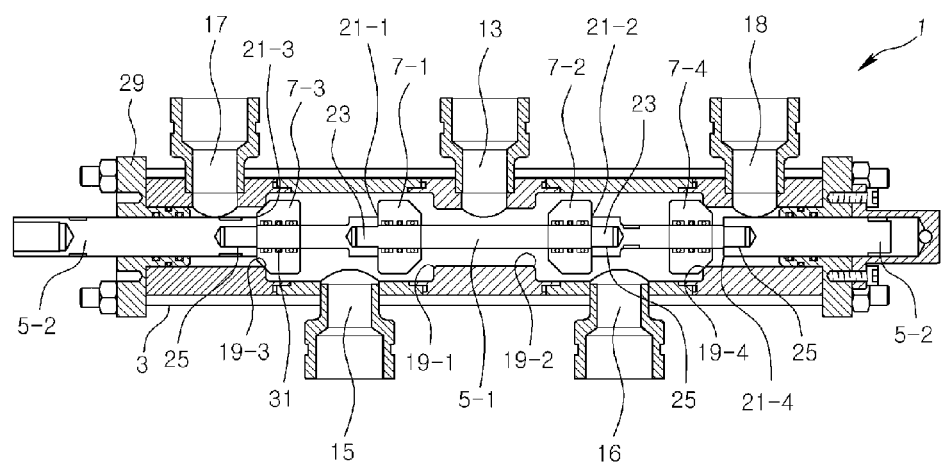
FIG. 10 is a longitudinal section view of illustrating that the operating rod of the flow path switching valve of FIG. 2 is located in the middle.

In the flow path switching valve 1 according to the first exemplary embodiment, the operating rod 5 is located in the middle of the tube body 3 in the neutral state as shown in FIG. 10. At this time, the left and right drain valve bodies 7-3 and 7-4 are seated on the left and right drain seat units 19-3 and 19-4, respectively, and the sucking valve bodies 7-1 and 7-2 located on the left and right of the inlet 13 separate in the corresponding sucking seat units 19-1 and 19-2, respectively. Thus, as shown therein, the operating fluid introduced from the fluid supplying source 11 into the tube body 3 via the inlet 13 passes through the left and right sucking seat units 19-1 and 19-2 and is discharged to both the left and right outlets 15 and 16. At this time, the left and right drains 17 and 18 are blocked up by the left and right drain valve bodies 7-3 and 7-4, thereby discharging no operating fluid.

From the above neutral state, if the operating rod 5 is moved rightward in the tube body 3 by an external operating unit, the sucking projection unit 21-1 of the operating rod 5 located on the left of the inlet 13 presses the sucking valve body 7-1 located on the left of the inlet 13 to be in close contact with the sucking seat unit 19-1 located on the left of the inlet 13 as shown in FIG. 3, thereby obstructing the flow path from the inlet 13 to the left outlet 15. Simultaneously, the sucking projection unit 21-2 located on the right of the inlet 13 is sufficiently spaced apart rightward from the sucking seat unit 19-2 located on the right of the inlet 13, so that the sucking valve body 7-2 on the right of the inlet 13 can be pushed toward the right sucking projection unit 21-2 by the pressure of the operating fluid introduced through the inlet 13 and separate from the sucking seat unit 19-2. Thus, the flow path from the inlet 13 to the right outlet 16 is formed, so that the operating fluid introduced through the inlet 13 can be discharged via the right outlet 16. At this time, the left drain valve body 7-3 is pushed by the left drain projection unit 21-3 and separated from the left drain seat unit 19-3, so that the left outlet 15 can be opened toward the left drain 17, thereby discharging the operating fluid accommodated in the left side of the tube body 3. Further, the right drain valve body 7-4 is pressed rightward by the pressure of the operating fluid introduced through the inlet 13 and closely contacts the right drain projection unit 19-4, thereby obstructing communication between the right outlet 16 and the right drain 18.

On the other hand, if the operating rod 5 is moved leftward in the tube body 3, the sucking projection unit 21-2 of the operating rod 5 located on the right of the inlet 13 presses the sucking valve body 7-2 located on the right of the inlet 13 to be in close contact with the sucking seat unit 19-2 located on the right of the inlet 13 as shown in FIG. 4, thereby obstructing the flow path from the inlet 13 to the right outlet 16. Simultaneously, the sucking projection unit 21-1 located on the left of the inlet 13 is sufficiently spaced apart leftward from the sucking seat unit 19-1 located on the left of the inlet 13, so that the sucking valve body 7-1 on the left of the inlet 13 can be separated from the left sucking seat unit 19-1 and pushed toward the left sucking projection unit 21-1 by the pressure of the operating fluid introduced through the inlet 13. Thus, the flow path from the inlet 13 to the left outlet 15 is formed, so that the operating fluid introduced through the inlet 13 can be discharged to the outside via the left outlet 15. At this time, the right drain valve body 7-4 is pushed by the right drain projection unit 21-4 and separated from the right drain seat unit 19-4, so that the right outlet 16 can be opened toward the right drain 18, thereby discharging the operating fluid accommodated in the right side of the tube body 3. Further, the left drain valve body 7-3 is pressed leftward by the pressure of the operating fluid introduced through the inlet 13 and closely contacts the left drain projection unit 19-3, thereby obstructing communication between the left outlet 15 and the left drain 17.

Meanwhile, in the flow path switching valve 101 according to the second exemplary embodiment, as shown in FIG. 11, the operating rod 105 is located at the right dead point, and the sucking valve body 107-1 on the right of the inlet 113 is pressed by the left sucking projection unit 121-1 and closely contacts the left sucking seat unit 119-1 at the rightmost position, so that the flow path from the inlet 113 to the left outlet 115 can be blocked up. Simultaneously, the sucking projection unit 121-2 on the right of the inlet 113 is sufficiently spaced apart rightward from the sucking seat unit 119-2 on the right of the inlet 113, so that the sucking valve body 107-2 on the right of the inlet 113 can be pushed by the operating fluid introduced via the inlet 113 until being stopped by the right sucking projection unit 121-2 and be thus opened. Accordingly, the flow path is formed from the inlet 113 to the right outlet 116, so that the operating fluid introduced via the inlet 113 can be discharged through the right outlet 116. At this time, the left drain valve body 107-3 is pushed by the left drain projection unit 121-3 and separated from the left drain seat unit 119-3, and thus the left outlet 115 is opened toward the left drain 117 so that the operating fluid introduced to the left outlet 115 as well as the operating fluid accommodated in the left side of the tube body 103 can be discharged to the drainage tank and the like. Also, the right drain valve body 107-4 is pressed rightward by the pressure of the operating fluid introduced through the inlet 113 and closely contacts the right drain seat unit 119-4, thereby obstructing the communication between the right outlet 116 and the right drain 118.

In this state, if the operation rod 105 is moved leftward by the actuator, the left drain projection unit 121-3 first enters the left drain seat unit 119-3 as shown in FIG. 12, and the left drain valve body 107-3 reaches the left drain seat unit 119-3 by friction with the operating rod 105 and the force of the fluid in the tube body 103 before the left sucking valve body 107-1 is separated from the left sucking seat unit 119-1, thereby blocking up the flow between the outlet 115 and the drain 117. At this time, the left sucking valve body 107-1 and the right drain valve body 107-4 respectively maintain the close contact with the left sucking seat unit 119-1 and the right drain seat unit 119-4, while the right sucking valve body 107-2 still maintains opened since the spool unit of the right sucking valve body 107-2 is not in close contact with the right sucking seat unit 119-2 yet, thereby continuing the fluid communication between the inlet 113 and the right outlet 116.

In this state, the operating rod 105 is further moved leftward, the flow path switching valve 101 is located in the neutral section as shown in FIG. 13. At this time, the left sucking projection unit 121-1 is moved leftward so that the spool unit of the left sucking valve body 107-1 can be separated from the left sucking seat unit 119-1. Meanwhile, the left and right drain valve bodies 107-3 and 107-4 strongly close-contact the left and right drain seat units 119-3 and 119-4 by the operating fluid, and the operating fluid introduced through the inlet 113 is halved and discharged to the left and right outlets 115 and 116 since the spool unit of the right sucking valve body 107-2 is not in close contact with the right sucking seat unit 119-2 yet.

Continually, if the operating rod 105 is moved leftward, the right sucking valve body 107 is pushed leftward by the right sucking projection unit 121-2 as shown in FIG. 14, and thus the spool unit of the right sucking valve body 107-2 closely contacts the right sucking seat unit 119-2 just before the right drain valve body 107-4 pushed by the right drain projection unit 121-4 is separated from the right drain seat unit 119-4, thereby blocking up the fluid communication between the inlet 113 and the right outlet 116.

Next, if the operating rod 105 is further moved leftward and reaches the left dead point, the right sucking valve body 107-2 pushed leftward by the right sucking projection unit 121-2 closely contacts the right sucking seat unit 119-2 by its spool unit, thereby first obstructing the communication between the inlet 113 and the right outlet 116. Then, the right drain projection unit 121-4 presses the right drain valve body 107-4 leftward to be separated from the right drain seat unit 121-4, thereby forming the flow between the right outlet 116 and the right drain 118. Thus, the operating fluid introduced through the inlet 113 is all discharged through the left outlet 115. Meanwhile, as the operating fluid on the right of the tube body 103 is discharged to the drainage tank through the right drain 118, external operating fluid is introduced into the tube body 103 via the right outlet 116.

At this time, the left drain valve body 107-3 strongly close-contact the left drain seat unit 119-3 by the operating fluid passing through the guide unit of the left sucking valve body 107-1, thereby preventing the operating fluid from leaking toward the left drain 117. Also, since the flow path between the inlet 113 and the right drain 118 is first obstructed by the long spool unit of the right sucking valve body 107-2, and then the flow path between the right drain 118 and the right outlet 116 is opened, the operating fluid introduced through the inlet 113 is prevented from being directly discharged to the right drain 118.

On the other hand, if the operating rod 105 is moved from the left dead point of FIG. 15 rightward as shown in FIG. 16, the right drain valve body 107-4 closely contacts the right drain seat unit 119-4 like that case of FIG. 12 before the spool unit of the right sucking valve body 107-2 is separated from the right sucking seat unit 119-2 and the flow path between the inlet 113 and the right outlet 116 is opened, thereby first blocking up the flow path between the right outlet 116 and the right drain 118.

In succession, if the operation rod 105 is further moved rightward, the flow path switching valve 101 is opened as the right sucking valve body 107-2 is moved rightward and thus experiences the neutral section shown in FIG. 13, thereby becoming the state shown in FIG. 17. In this state, like that shown in FIG. 14, the left sucking valve body 107-1 first blocks up the flow path from the inlet 113 to the left outlet 115 before the left drain valve body 107-3 is separated from the left drain seat unit 119-3, so that the flow path switching valve 101 can prevent the operating fluid introduced via the inlet 113 from being directly discharged through the left drain 117 when the left drain 117 is opened.

Meanwhile, the flow path switching valve 101 further includes the balancing projection units 121-5 and 121-6, the balancing valve bodies 107-5 and 107-6, and the pair of bypassing tubes 135 and 136 as shown in FIG. 20. For example, if the sucking valve body 107-2 is moved from the illustrate state to the high pressure side connected to the inlet 113, the pressure of the inner space 134-1 opened toward the inlet 113 and maintaining the high pressure directly acts on the balancing chamber 133-2 through the bypassing tube 136, so that the operating rod 105 can be pressed in the direction of (A) along with the balancing valve body 107-6 pressed by the inner pressure of the balancing chamber 133-2, thereby decreasing the force needed for moving the sucking valve body 107-2 to the high pressure side, i.e., in the leftward direction of FIG. 20. In result, the pressure acting on the front or rear of the sucking valve body 107-2 or 107-1 is offset by the bypassing tube 136 or 135, so that the force needed for reciprocating the operating rod 105 can be largely decreased.

Figure 21:
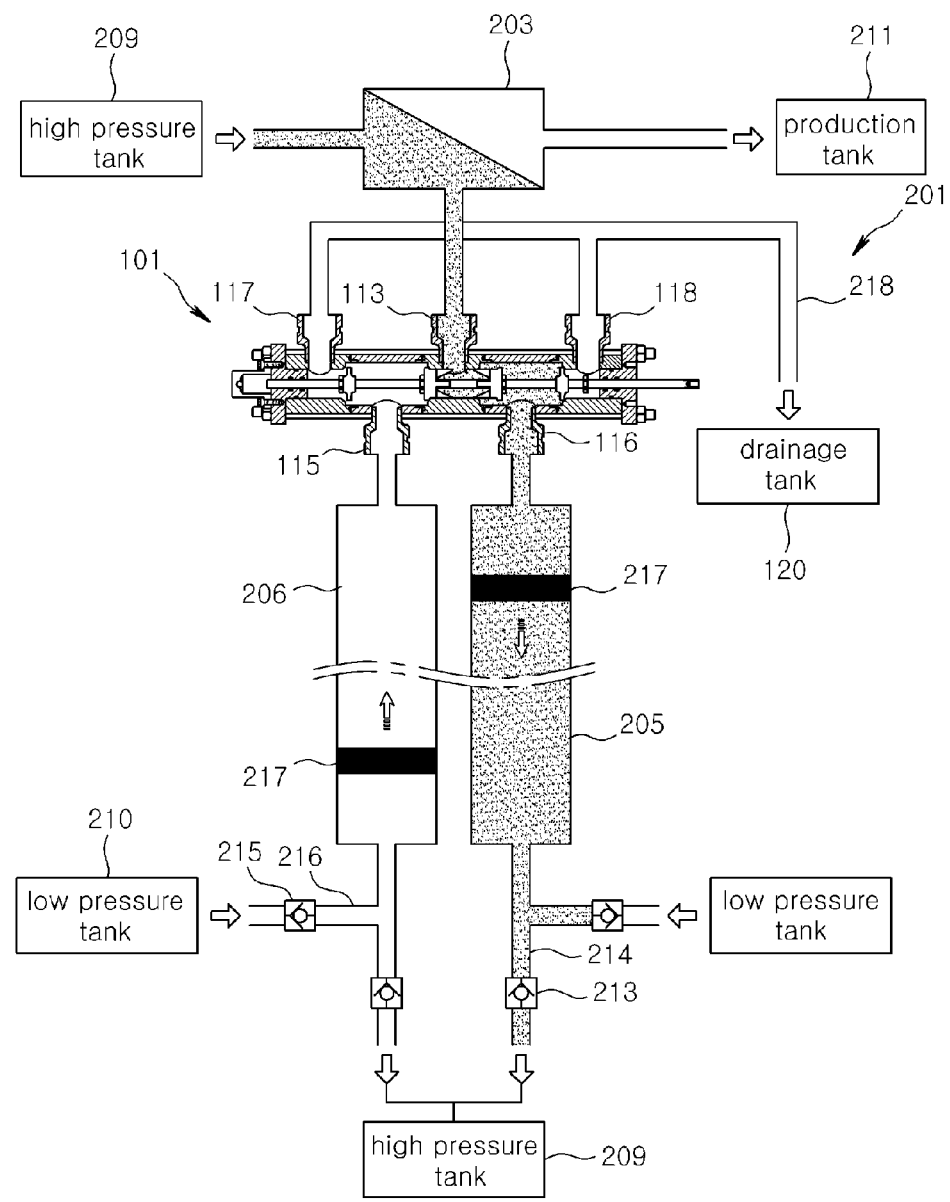
FIG. 21 is a view showing an energy recovery apparatus of a desalination system based on reverse osmotic pressure, to which a flow path switching valve according to a second exemplary embodiment is applied.

Accordingly, if the flow path switching valve 101 according to the second exemplary embodiment is applied to an energy recovery apparatus 201 of a desalination system using reverse osmotic pressure as shown in FIG. 21, in a process of producing processing water in a reverse osmotic module 203 through high pressure water supplied from a high pressure tank 209 and supplying it to a production tank 211, high-pressure concentrated water discharged from the reverse osmotic module 203 is supplied to a right power recovery chamber 205 via the flow path switching valve 101, and the high-pressure concentrated water supplied to the power recovery chamber 205 strongly pushes a piston 217 in the power recovery chamber 205 and moves it down. Thus, low pressure water pressed by the piston 217 in the chamber 205 is pressed at high pressure, and supplied to the high pressure tank 209 via a check valve 213 in an outlet pipe 14. At the same time, the flow path switching valve 101 is also opened toward a drainage tank 120, so that the low pressure water of the low pressure tank 210 can be supplied to a left power recovery chamber 206 through a branch pipe 216 via a check valve 215. Thus, the operating fluid in the chamber 206 is pressed by the piston 217 and passes through the flow path switching valve 101, thereby being discharged by low pressure to the drainage tank 120 along a drain pipe 218.

Like this, the high pressure concentrated water, which is introduced from the reverse osmotic module 203 via the inlet 113, discharged to the outlets 115 and 116 via the flow path switching valve 101, and alternately supplied to the power recovery chambers 205 and 206, transfers the high pressure to the low pressure water alternately introduced from the low pressure tank 210 to the power recovery chambers 205 and 206, and is then discharged to the drainage tank 120 through the drains 117 and 118 after alternately passing through the flow path switching valve 101 via the outlets 115 and 116.

Also, the low pressure water from the low pressure tank 201 alternately filled in the power recovery chambers 205 and 206 receives the high pressure from the high pressure concentrated water in the power recovery chambers 205 and 206, and is then supplied to the high pressure tank 209 by high pressure.

As described above, there is provided a flow path switching valve, in which four or more valve bodies are movably mounted to one operating rod in order to control a valve flow path to be opened and closed, and thus one operating unit for operating the operating rod, i.e., one actuator is enough, thereby largely decreasing costs of equipment, maintenance or operation.

Also, even if seawater, brine or the like water is used as the operating fluid, the valve body can smoothly move in a tube body while little leakage occurs between the valve body and the tube body, thereby significantly increasing working efficiency or reliability of the valve.

Also, the valve body is movable on the operating rod, and the operating rod is configured by assembling many short bars, so that not only assembling efficiency between the valve body and the operating rod can be largely enhanced but also work or costs needed for repair, replacement or the like maintenance of the valve body or operating rod can be reduced, and the valve body at a part where abrasion occurs is easily replaceable, so that the durability of the whole valve can be remarkably improved.

Also, an sucking valve body has not only a poppet structure with an inclined surface but also a spool structure of prolonging a sealing contact time based on a sliding contact surface, so that high pressure operating fluid cannot leak within the valve tube body, for example, the high pressure operating fluid discharged from a fluid supplying source cannot be directly supplied to a drainage tank while opening or closing the valve, or the like, thereby increasing the reliability of operating the valve.

Further, fluid pressure at a high pressure side is transferred to a balancing chamber through a bypassing tube so that fluid force urging the operating rod can be balanced, thereby minimizing energy consumed in moving the operating rod toward the high pressure side and maximizing energy efficiency.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A flow path switching valve comprising:
a tube body which comprises one or more inlets opened to communicate with a fluid supplying source and supplying fluid into an inside, two or more outlets opened at opposite sides to the respective inlets and selectively alternately discharging the fluid from the inside, drains opened at opposite ends and discharging operating fluid introduced through the outlets, and a plurality of seat units respectively protruding on an inner circumference between the inlets, the outlets and the drains;
an operating rod which is coaxially mounted in the tube body, comprises a plurality of projection units protruding as being spaced apart from each other on an outer circumference thereof, is connected to an operating unit at one end thereof hermetically exposed to an outside, and reciprocates forward and backward in an axial direction within the tube body by the operating unit; and
a plurality of valve bodies which are movably mounted onto the outer circumference of the operating rod and arranged between the respective projection units to face and one-to-one correspond to the respective seat units, wherein the operating rod comprises
a main bar arranged in a section between sucking seat units and processed to have bolts at opposite ends thereof,
end bars arranged in an outer section of drain seat units, each end bar processed to have a bolt hole at an inner side facing the main bar; and
connection bars arranged between the main bar and the respective end bars, and processed to have a bolt hole at an inner side facing the main bar and a bolt at an outer side facing the end bar.

2. The flow path switching valve according to claim 1,
wherein when the valve body pressed by one projection unit of the projection units disposed on both sides of the inlet is seated on one sucking seat unit of sucking seat units disposed on both sides of the inlet,
wherein another projection unit is formed at a location where the valve body can be separated from the other sucking seat unit by pressure of fluid introduced via the inlet,
wherein an end projection unit is formed at a location where a drain valve body can be separated from an end drain seat unit disposed between the one end outlet and the one drain, and
wherein another end projection unit is formed at a location where another drain valve body can be seated on another end drain seat unit disposed between the other end outlet and the other drain.

3. The flow path switching valve according to claim 1,
wherein when the valve body pressed by a projection unit of the projection units disposed on both sides of an inlet of the one or more inlets is seated on a sucking seat unit of sucking seat units disposed on both sides of the inlet,
wherein the projection unit is formed at a location where the valve body can be separated from the sucking seat unit by pressure of fluid introduced via the inlet,
wherein an end projection unit is formed at a location where a drain valve body can be seated on an end drain seat unit disposed between the one end outlet and the one drain, and
wherein another end projection unit is formed at a location where another drain valve body can be separated from another end drain seat unit disposed between the other end outlet and the other drain.

4. The flow path switching valve according to claim 3, wherein the valve body is provided in the form of a poppet, a disk or a hemisphere, and the seat unit has an inclined or flat surface to closely contact an inclined surface of the poppet, a flat surface of the disc and/or a spherical surface of the hemisphere, respectively.

5. The flow path switching valve according to claim 4, further comprising a sealing ring interposed between the valve body and the seat unit and coupled to either of the valve body or the seat unit.

6. The flow path switching valve according to claim 1, wherein the sucking valve body comprises
a poppet unit coaxially coupled to the operating rod and having an outer diameter larger than an inner diameter of the sucking seat unit;
a spool unit protruding from the poppet unit toward the sucking seat unit and securing a length enough to closely contact the sucking seat unit before the drain projection unit separates the drain valve body from the drain seat unit; and
a guide unit radially protruding from the spool unit toward the sucking seat unit while leaving a predetermined distance from each other, and keeping inserted in the sucking seat unit even at a maximum opening position, and wherein the other one drain projection unit is formed at a location where the other one drain valve body can closely contact the other one corresponding drain seat unit before the other one sucking valve body is separated from the other one corresponding sucking seat unit.

7. The flow path switching valve according to claim 6, wherein the one drain projection unit is formed at a location where the one sucking projection unit makes the one corresponding sucking valve body closely contact the one sucking seat unit and then the one drain valve body be separated from the one corresponding drain seat unit, and
the one sucking valve body is configured to closely contact the one sucking seat unit before the one drain projection unit makes the one drain valve body be separated from the one drain seat unit, and continuously block up flow from the inlet to the one drain while the one drain valve body is separated from the one drain seat unit.

8. The flow path switching valve according to claim 6, further comprising
a balancing projection unit formed on the operating rod between the opposite ends of the tube body and the opposite drains;
a balancing valve body mounted to the operating rod between the opposite ends of the tube body and the balancing projection unit and slidably contacting the inner circumference of the tube body to form a balancing chamber together with the opposite ends of the tube body; and
at least one pair of bypassing tubes for connecting the respective balancing chamber with an inner space of the tube body of which the outlet relatively far away from the balancing chamber of the at least one pair of outlets is opened.

9. The flow path switching valve according to claim 6, wherein the sucking valve bodies are respectively fixed on surfaces of the corresponding sucking projection units facing the inlet.

10. The flow path switching valve according to claim 1,
wherein the plurality of valve bodies comprises a plurality of sucking valve bodies and a plurality of drain valve bodies,
wherein the plurality of seat units comprises a plurality of sucking seat units and a plurality of drain seat units,
wherein the plurality of projection units comprise a plurality of sucking projection units and a plurality of drain projection units.

11. The flow path switching valve according to claim 10, wherein each sucking valve body comprises:
a poppet unit coaxially coupled to the operating rod and having an outer diameter larger than an inner diameter of a sucking seat unit corresponding to the sucking valve body;
a spool unit protruding from the poppet unit toward the respective sucking seat unit and securing a length enough to closely contact the respective sucking seat unit before a drain projection unit on a corresponding side of the operating rod separates a respective drain valve body from a corresponding drain seat unit; and
a guide unit radially protruding from the spool unit toward the respective sucking seat unit while leaving a predetermined distance from each other, and keeping inserted in the respective sucking seat unit even at a maximum opening position.

12. A flow path switching valve comprising:
a tube body which comprises one or more inlets opened to communicate with a fluid supplying source and supplying fluid into an inside, two or more outlets opened at opposite sides to the respective inlets and selectively alternately discharging the fluid from the inside, drains opened at opposite ends and discharging operating fluid introduced through the outlets, and a plurality of seat units respectively protruding on an inner circumference between the inlets, the outlets and the drains;
an operating rod which is coaxially mounted in the tube body, comprises a plurality of projection units protruding as being spaced apart from each other on an outer circumference thereof, is connected to an operating unit at one end thereof hermetically exposed to an outside, and reciprocates forward and backward in an axial direction within the tube body by the operating unit; and
a plurality of valve bodies which are movably mounted onto the outer circumference of the operating rod and arranged between the respective projection units to face and one-to-one correspond to the respective seat units,
wherein the operating rod comprises
    a main bar, arranged in a section between the seat units, comprising a first bolt at a first end and a second bolt at a second end opposite the first end,
    a first connection bar, connected to the first end of the main bar, comprising a bolt hole at a first end adjacent the first bolt of the main bar and comprising a bolt at a second end opposite the first end,
    a second connection bar, connected to the second end of the main bar, comprising a bolt hole at a first end adjacent the second bolt of the main bar and comprising a bolt at a second end opposite the first end,
    a first end bar, comprising a bolt hole at a first side adjacent the bolt of the first connection bar, connected to the second end of the first connection bar,
    a second end bar, comprising a bolt hole at a first side adjacent the bolt of the second connection bar, connected to the second end of the second connection bar.

13. The flow path switching valve according to claim 12, wherein when a first valve body of the plurality of valve bodies is pressed by a first projection unit of the plurality of projection units disposed on both sides of the inlet is seated on a first sucking seat unit of a plurality of sucking seat units disposed on both sides of the inlet,
    a second projection unit of the plurality of projection units is formed at a location where a second valve body of the plurality of valve bodies can be separated from a second sucking seat unit of the plurality of sucking seat units by pressure of fluid introduced via the inlet,
    a third projection unit of the plurality of projection units is formed at a location where a third valve body of the plurality of valve bodies can be separated from a first drain seat unit disposed between a first outlet of the two or more outlets and a first drain, and
    a fourth projection unit of the plurality of projection units is formed at a location where a fourth valve body can be seated on a second drain seat unit disposed between a second outlet of the two or more outlets and a second drain.

14. The flow path switching valve according to claim 12, wherein when a first valve body of the plurality of valve bodies is pressed by a first projection unit of the plurality of projection units disposed on both sides of the inlet is seated on first sucking seat unit of a plurality of sucking seat units disposed on both sides of the inlet,
    a second projection unit of the plurality of projection units is formed at a location where a second valve body can be separated from a second sucking seat unit by pressure of fluid introduced via the inlet,
    a third projection unit of the plurality of projection units is formed at a location where a third valve body of the plurality of valve bodies can be seated on a first drain seat unit disposed between a first outlet and a first drain, and
    a fourth projection unit of the plurality of projection units is formed at a location where a fourth valve body of the plurality of valve bodies can be separated from a second drain seat unit disposed between a second outlet and a second drain.

15. The flow path switching valve according to claim 14, wherein each of the first through fourth valve bodies are provided in the form of a poppet, a disk or a hemisphere, and each of the first and second sucking seat units and each of the first and second drain seat units has an inclined or flat surface to closely contact an inclined surface of the poppet, a flat surface of the disc and/or a spherical surface of the hemisphere, respectively.

16. The flow path switching valve according to claim 15, further comprising a sealing ring interposed between a respective valve body and corresponding seat unit, the sealing ring being coupled to either of the valve body or the seat unit.

* * * * *